United States Patent [19]

Tracy

[11] Patent Number: 5,322,242
[45] Date of Patent: Jun. 21, 1994

[54] HIGH EFFICIENCY, SUPERSONIC AIRCRAFT

[76] Inventor: Richard R. Tracy, 3000 Old Ranch Rd., Carson City, Nev. 89704

[21] Appl. No.: 13,065

[22] Filed: Feb. 3, 1993

Related U.S. Application Data

[63] Continuation of Ser. No. 726,936, Jul. 8, 1991, abandoned.

[51] Int. Cl.[5] .......................... B64C 3/38; B64C 21/00
[52] U.S. Cl. .................................... 244/36; 244/35 A; 244/204; 244/45 R
[58] Field of Search ...................... 244/35 R, 35 A, 36, 244/198, 204, 213, 214, 215, 45 R

[56] References Cited

U.S. PATENT DOCUMENTS

| | | |
|---|---|---|
| D. 172,588 | 7/1954 | Fleming et al. .................. D12/342 |
| D. 179,348 | 12/1956 | Johnson .............................. D12/342 |
| D. 186,962 | 12/1959 | Kux ..................................... D12/342 |
| D. 204,108 | 3/1966 | Peterson ............................ D12/342 |
| D. 266,161 | 9/1982 | Rosenthal ............................ 244/15 |
| D. 295,037 | 4/1988 | Stalony-Dabrzanski et al. ...................................... D12/331 |
| 2,709,052 | 5/1955 | Berg ................................. 244/35 R |
| 2,997,256 | 8/1961 | Walker ................................. 244/15 |

FOREIGN PATENT DOCUMENTS 3727608  3/1989  Fed. Rep. of Germany .... 244/45 R

OTHER PUBLICATIONS

John D. Anderson, Jr., Fundamentals Of Aerodynamics, 1984, pp. 370–372.
Francis J. Hale, Aircraft Performance Selection And Design, 1984, pp. 14–17.
"Flight", Sep. 26, 1952, p. 410, vol. LXII.

Primary Examiner—Michael S. Huppert
Assistant Examiner—Virna Lissi Ansley
Attorney, Agent, or Firm—William W. Haefliger

[57] ABSTRACT

A supersonic flight aircraft having a longitudinally forwardly extending axis in the direction of flight, and a wing, comprising a wing extending generally laterally relative to the axis, and having a leading edge angled forward or rearwardly relative to a normal to the axis at an angle $\Omega$, and the wing having a maximum thickness t; the angle $\Omega$ and thickness t characterized that in that in supersonic flight conditions, the forwardmost shock wave produced in association with the wing extends generally along or rearwardly of the leading edge, whereby laminar airflow conditions are maintained over the leading edge and adjacent the surface of the wing.

20 Claims, 7 Drawing Sheets

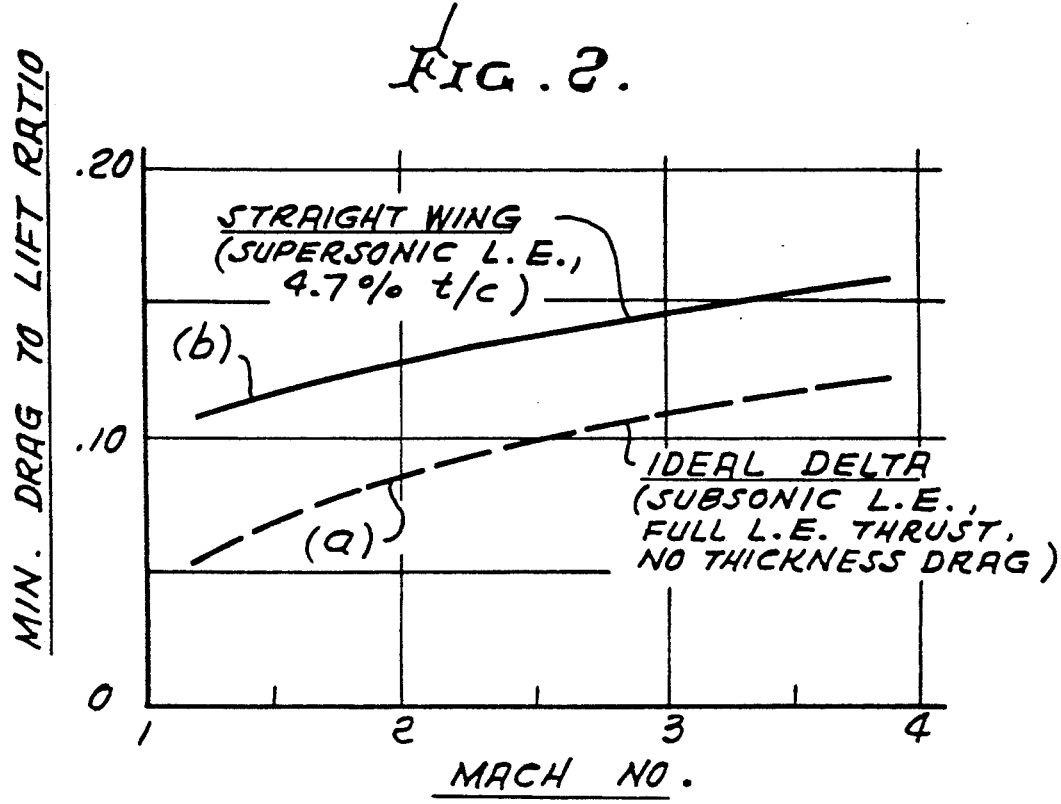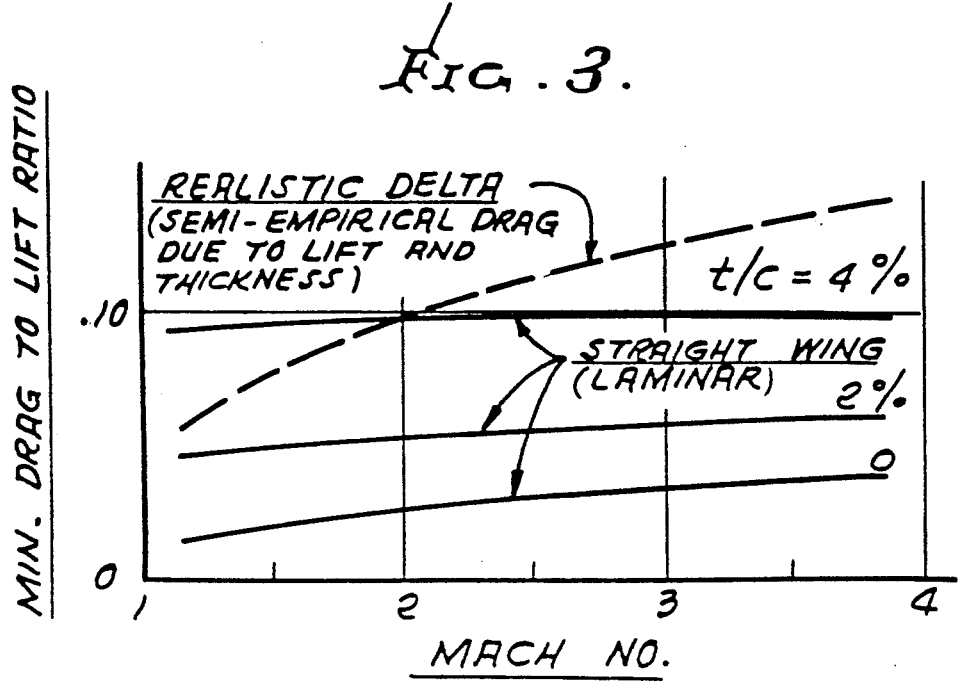

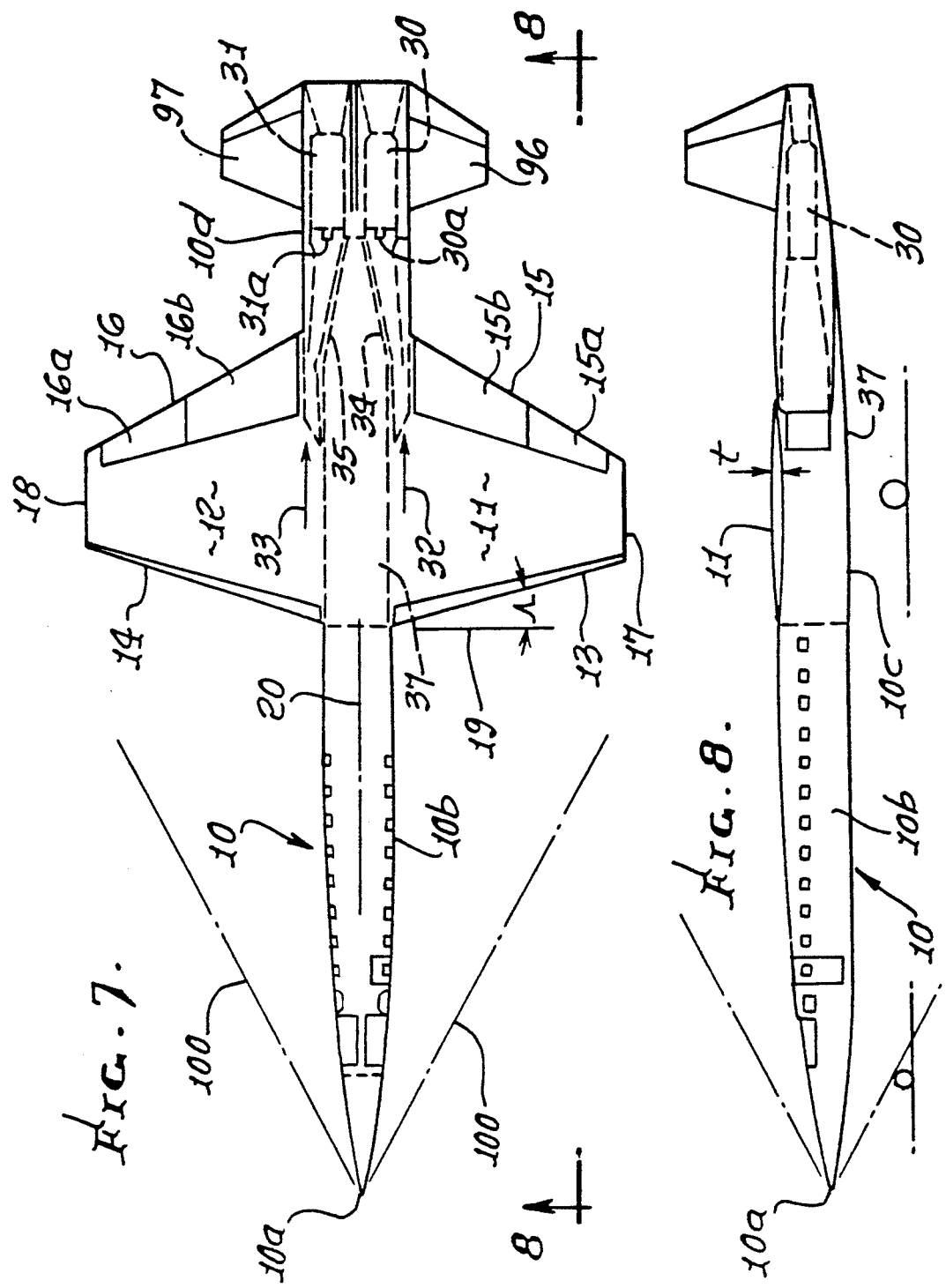

HIGH EFFICIENCY, SUPERSONIC AIRCRAFT

This is a continuation of Ser. No. 07/726,936, filed Jul. 8, 1991, now abandoned.

BACKGROUND OF THE INVENTION

This invention relates generally to long-range, supersonic cruise aircraft, and improvements in the wings of such aircraft.

Supersonic transports (SSTS) have been proposed in the past; however, swept-back wings of such aircraft have introduced inefficiencies due to high skin friction development resulting from the turbulent boundary layer air flow associated with such highly swept wings. This skin friction drag contributes to undesirably high fuel consumption, and results in concomitant high operating expense and short range. Furthermore, the high sweep and short span of such wings results in very inefficient subsonic flight and poor takeoff and landing performance. Accordingly, the main obstacle to widespread acceptance of the supersonic transport is its relatively poor range and fuel efficiency, resulting in uncompetitive economics. The basic cause of this uncompetitive performance is the low lift to drag ratio (L/D) of presently used and proposed SSTs, at both supersonic and subsonic speeds.

For more than three decades, the aeronautical community has tried to improve the L/D (lift-to-drag ratio) of long-range, supersonic military and civil aircraft designs. Despite these efforts, the gains have been marginal and far from the 30%-plus improvement in cruise L/D needed to approach the range and operating economics of subsonic transports. All of the aerospace industry-proposed designs are based on modifications of the delta wing (a point-forward triangle). The reason for this choice is that the modified delta wing (and other highly swept forms) has been shown theoretically to have lower supersonic drag due to lift than a wing planform with relatively low sweep, and also lower wave drag due to thickness. In consequence, the delta wing can be thicker, thus reducing structural weight and providing more volume for fuel and equipment.

The delta wing family also has recognized disadvantages; and because it has been the sole candidate for SSTs, these disadvantages are widely assumed to be unavoidable for all SSTs. Two of these disadvantages are the delta wing's high drag due to lift at subsonic speed and low maximum lift even at an uncomfortably high angle of attack. These traits lead to the need for high power and high speed during takeoff and landing, resulting in high noise levels.

SUMMARY OF THE INVENTION

The principal object of the present invention is to provide an improved wing design, usable for long-range, supersonic cruise aircraft, including SSTs, which substantially mitigates the subsonic disadvantages mentioned and, more important, decreases wing drag at supersonic speed by as much as 50% or more. Such wing drag reduction is enough to increase the supersonic L/D of an SST by 30% or more, enabling the SST to offer range and economics competitive with subsonic transports.

The key to the improved SST wing design is to facilitate and exploit the existence of a laminar boundary layer over most of the wing surface. Certain considerations must be recognized and taken into account in order to achieve these qualities, which result in a much different wing from the industry standby delta wing.

It is well known that at typical flight conditions, either subsonic or supersonic, the skin friction drag caused by a laminar boundary layer is a small fraction of the skin friction of a turbulent boundary layer. It is also known that boundary layer stability theory predicts that the laminar boundary layer is much more stable in resisting transition to turbulent boundary layer flow at supersonic speeds than at subsonic speeds. Until recently, there were no reliable quantitative test data supporting this prediction, and most wind tunnel tests gave conflicting or inconclusive results. Recently, tests at Mach 3.5 in low turbulence, or "quiet" wind tunnel, intended to provide a test of boundary layer stability theory, did closely confirm the theoretically predicted stability of the laminar boundary layer.

Employing stability theory, one can discern various influences on stability of the laminar boundary layer, such as the stabilizing effects of a favorable pressure gradient (pressure decrease falling in streamwise direction) and reduced skin temperature (up to Mach number of about 4); and one can discern that crossflows in the boundary layer have a severe destabilizing effect and cause transition to turbulent flow at or near the leading edge of any highly swept wing.

According to the present invention, in order to achieve a substantial reduction of wing drag in supersonic flight, compared to any of the modified delta or other highly swept types of wing, three conditions must be satisfied:

1. The improved wing must be positioned and configured to maintain a laminar boundary layer over a majority of the wing chord (streamwise length).

2. The improved wing airfoil thickness and shape must be designed to limit the wave drag due to thickness to about the same magnitude as the drag due to skin friction.

3. The wing area must be such that wing loading (aircraft weight divided by total wing area) results in an angle of attack at cruise which is close to optimum, that is, where the lift-dependent drag is equal to the total aircraft zero-lift drag.

In accordance with the first criterion, the leading edges of the wing planform are sharp and are swept aft or forward at less than the Mach angle, in order to prevent local subsonic flow near the leading edge and associated strong crossflows, and the airfoil contour is such as to provide an increasingly strong negative (or favorable) pressure gradient from leading to trailing edge to stabilize the laminar boundary layer. For a given design cruise condition, the minimum stabilizing favorable pressure gradient profile can be determined from experiment or boundary layer stability theory; and the wing contour can be developed to minimize wave drag with the constraint that the pressure gradient criterion is met or exceeded. During design and construction of the wing, the surface of the airfoil must be kept free of discontinuities and irregularities large enough to disturb the flow outside the boundary layer or to prematurely destabilize the laminar boundary layer. Finally, the wing is positioned relative to the fuselage and engine inlets such that no shock waves cross the wing, since they could alter the favorable gradient sufficiently to prematurely destabilize the boundary layer and cause transition to turbulent flow.

In accordance with the second criterion, the wing airfoil has a suitable supersonic profile, such as a sharpedged, modified circular arc, and more important, it is extremely thin. Under typical flight conditions, the thickness to chord ratio must be in the range of not more than about 2.0%. Somewhat greater thickness could be used, but since the thickness wave drag increases as the square of the thickness to chord ratio, substantial increase in thickness would largely offset the drag reduction due to the laminar boundary layer. As a result, the task is to design a wing which meets strength and stiffness requirements within the thickness limitations of the second criterion. The final selection of thickness for a given design will be the result of balancing the increased weight of a thinner wing against the associated drag reduction.

The third criterion is well known in aerodynamic theory as the condition for minimum drag with a given lift (or weight), as long as the lift-dependent drag varies as the square of the lift, which is approximately the case for most aircraft designed for efficient flight, whether at supersonic or subsonic speed. Aerodynamic theory also shows that the lift coefficient for this condition will be less for the improved wing with laminar skin friction than for a typical delta wing with higher turbulent skin friction drag. Accordingly, the laminar wing can have either a lower wing loading or lower cruise altitude, or a combination of both, with resulting benefits of lower landing speed and reduced risk of ozone damage in the upper atmosphere.

The combination or use of the first two criteria has not previously been described in the aeronautical literature, nor reduced to practice with the intent of achieving substantial drag reduction in long-range supersonic aircraft, and such combination is a principal object of the present invention.

Further in accordance with the present invention, there are attainable combinations of thickness and laminarity for which a laminar flow configured wing has a calculated minimum drag which is lower than even a theoretically ideal delta wing, that is, one with no thickness drag and full leading edge suction, and substantially lower drag than that found in tests of well-designed, modified delta wings.

It is a further major object of the invention to provide an improved supersonic cruise aircraft, such as an SST, with much improved efficiency, resulting in reduced fuel consumption and increased range at supersonic speeds. Basically, the improved aircraft has a suitably designed fuselage, longitudinally extended in the direction of flight, and an improved wing, and is characterized by a) the wing extending generally laterally relative to the longitudinal axis, and having a leading edge angled forward or rearwardly relative to a normal to the axis at an angle $\Omega$, and the wing having a maximum thickness t, b) the angle $\Omega$ and thickness t characterized that in that in supersonic flight conditions at normal cruise speeds, the forwardmost shock wave produced in association with the wing extends generally along or rearwardly of the leading edge, whereby laminar boundary layer conditions are maintained over the leading edge and adjacent the surface of the wing.

As will be seen, the angle $\Omega$ is typically between 0° and about 30°, so is not a radically swept-back wing. The wing typically has much reduced thickness, as compared with conventional wings, to the extent that the wing does not carry the aircraft engine, or fuel for the engine, or fuel tanks, these being typically carried by the fuselage.

As will further be seen, the maximum limiting value of the angle $\Omega$, as referred to, is typically defined as follows:

$$\Omega \leq \text{arc cosine } (1/M)$$

where M=Mach number associated with the design cruise speed at said supersonic flight.

It is another object of the invention to provide an improved wing for an efficient, long-range, supersonic aircraft having optimum weight, such that the ratio of maximum thickness to chord dimension would be greatest at the wing root and least at the wing tip, for example at the wing root, the ratio being less than about 0.025; and at or proximate the wing tip, the ratio being less than about 0.015, such that the average ratio is less than about 0.020.

A further object is to provide an airfoil which has minimum combined drag due to thickness and skin friction for a given thickness, achieved by decreasing the curvature of the forward surface relative to a parabolic (circular arc) airfoil, and increasing the curvature of the aft surface to provide a stronger favorable pressure gradient and delay transition as far as possible, such delay being balanced against the greater wave drag of the increased curvature.

Under criteria a) and b) above, conditions conducive to extensive laminar boundary layer flow are maintained over the wing upper and lower surfaces from the leading edge to near the trailing edge of the wing surface at the design supersonic speed of the aircraft. Also, the location of the wing leading edge should be inboard of the principal shock wave flaring rearwardly from the nose of the aircraft.

Within the scope of the present invention, the wing trailing edges may have some thickness, rather than being sharp, to reduce wave drag, and relieve some of the pressure rise at the trailing edge, as well as facilitate construction.

A further object includes the provision of flap means associated with the wing leading and trailing edges and supported for downward deployment during subsonic flight, as during takeoff and landing of the aircraft. Such flap means typically extends lengthwise over the span of the wing leading and trailing edges. The flaps may also be used for more efficient cruise flight at subsonic speed, with reduced is deflection.

These and other objects and advantages of the invention, as well as the details of an illustrative embodiment, will be more fully understood from the following specification and drawings, in which:

DRAWING DESCRIPTION

FIG. 2 is a graph showing minimum drag, as a fraction of lift, for an ideal delta wing versus Mach number, and also for an unswept wing with supersonic leading edges;

FIG. 3 is a graph showing minimum drag, as a function of lift, for a series of actual unswept, laminar flow configured wings versus Mach number, and also for a delta wing;

FIG. 7 is a plan view of a supersonic aircraft having a wing in accordance with the present invention;

FIG. 8 is an elevation taken on lines 8—8 of FIG. 7; and

DETAILED DESCRIPTION

Figure 1A:
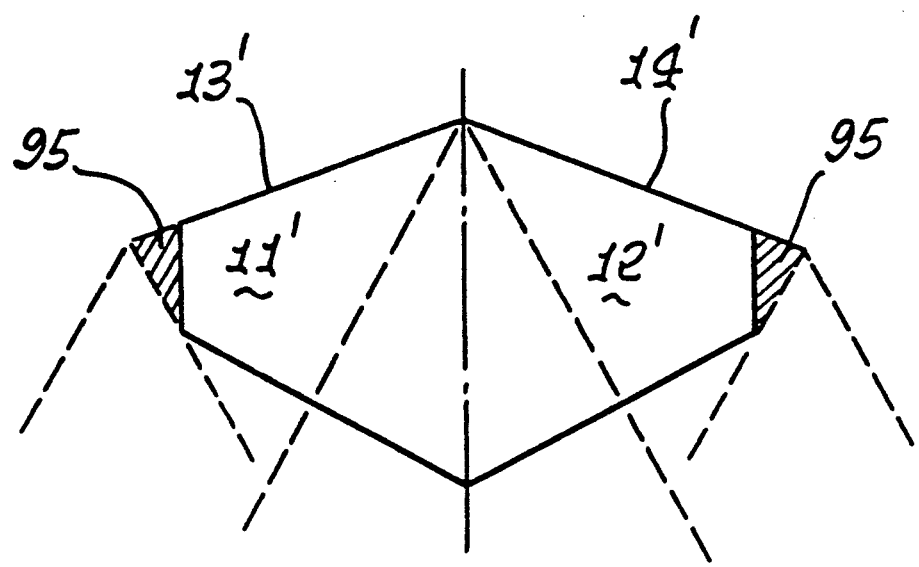
FIGS. 1a and 1b are a plan view of representative wings, a) showing a laminar-configured wing, and b) showing a modified delta wing, shock wave location also being shown.

Referring first to FIGS. 7 and 8, they show one example of a supersonic aircraft embodying a wing of the general type disclosed herein. As illustrated, the aircraft includes an elongated fuselage 10 having a sharply pointed forward terminal at 10a, a forward passenger-carrying section 10b, a mid-rear section 10c, and a tail-carrying section 10d which may be widened relative to section 10b. The aircraft frame associated with section 10c carries left and right wings 11 and 12 incorporating the present invention. The wings have leading edges 13 and 14, trailing edges 15 and 16, and outboard terminal edges 17 and 18. The trailing edges 15 and 16 may be defined by hinged flaps 15a and 15b, and 16a and 16b as shown. FIG. 8 shows the extreme thickness of each wing, its maximum thickness indicated at t, adjacent the fuselage.

In this regard, the wing has an associated ratio of maximum thickness t to chordal dimension C of less than 0.025, at or proximate the wing root. Also, the wing has an associated ratio of maximum thickness to chord dimension at or proximate the wing tip, the ratio being less than about 0.015. Angle $\Omega$ is further defined as:

$$\Omega \leq \text{arc cosine } (1/M)$$

where M = Mach number associated with the design cruise speed at said supersonic flight.

The leading edge of each wing is angled rearwardly and laterally relative to a normal 19 to the fuselage longitudinally forwardly extending axis 20, that angle indicated at $\Omega$. The angle $\Omega$ and the thickness t are characterized in that in supersonic flight conditions at normal cruise speeds, the forwardmost shock wave produced in association with the wing extends generally along or rearwardly of the leading edge, whereby laminar boundary layer conditions are maintained over the leading edge and adjacent the surface of the wing. Typically, the angle $\Omega$ is between 0° and 30°.

As is clear from FIG. 7, the engine means (engine or engines) are carried by the fuselage, whereby the wing or wings are free of support for the engine means. See in the example the two laterally spaced engines 30 and 31 carried by or within the fuselage sections 10d. Their intakes 30a and 31a receive air along paths as indicated by arrows 32 and 33, outwardly of barriers 34 and 35. In addition, the aircraft has fuel tank means entirely carried by the fuselage, whereby the wing is free of support for the fuel tank means. In the example, the forwardly elongated fuel tank 37 is carried by fuselage sections 10c and 10d, i.e., generally between, or inboard of, the wings, and also forward of the engines.

Figure 9A:
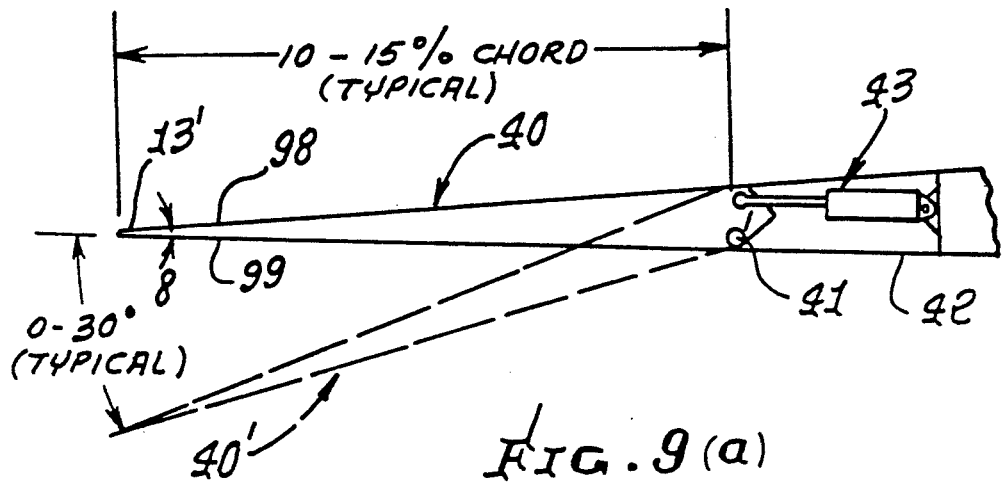
FIGS. 9a and 9b are a section through a laminar wing and having movable forward flap means, variations (a) and (b) being shown.
Figure 9B:
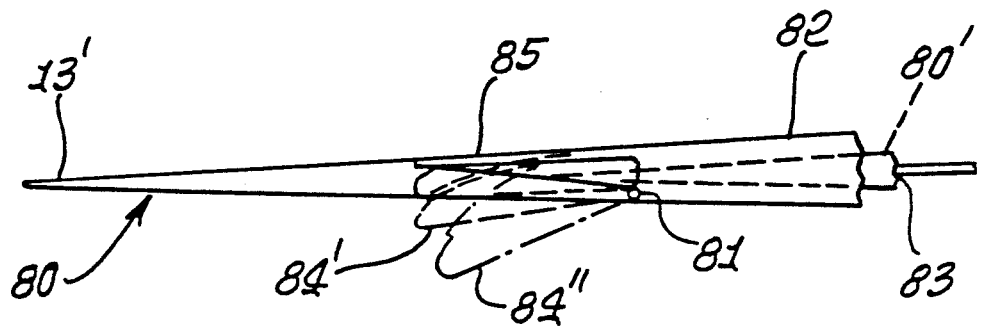

Also typically provided are leading edge flap means associated with the wing leading edge and supported for downward deployment during subsonic flight, as during landing of the aircraft. FIG. 9 (a) shows one such flap 40 which comprises a forwardmost section of the wing. It is hinged at 41 to a wing rearward section 42 to be downwardly deployed to the broken line position 40', as during landing. An actuator mechanism to advance and retract the flap is seen at 43, within section 42.

In FIG. 9 (b), the forward wing section 80 can be retracted to position 80' by actuator 83, after the blunt-nosed takeoff and landing flap 84 is lowered to position 84'', during takeoff and landing, a hinge 81 supporting flap 84. A flexible plate 85 covers the gap between section 80 and wing rearward section 82.

Additional characteristics are as follows:

1) laminar boundary layer conditions can be maintained over a majority of the wing surface;

2) the wing having an associated wave drag due to thickness and skin friction, and the wave drag of which is about the same magnitude as the skin friction drag;

3) supersonic leading and trailing wing edges located so that the fuselage and engine inlet have minimal adverse effect on the pressures over the majority of the wing surface;

4) wing airfoil having continuous and generally increasing convex shape from a sharp leading edge to or near the trailing edge;

5) wing thickness-to-chord ratio as thin as practical for strength and stiffness but not greater than about 2% as an areal average;

6) wing surface free of roughness, gaps and waviness capable of destabilizing the laminar supersonic boundary layer; and 7) a wing intended for use on a long-range supersonic aircraft which is configured and located so as to have a minimum drag which is equal to or less than the minimum ideal drag of a delta wing designed for the same purpose.

FIGS. 7 and 8 are representative of a long-range executive jet aircraft, designed for cruise speeds from about Mach 1.6 to 2.0 at up to 51,000 feet, and a maximum range of about 4,800 nautical miles, with air transport reserves. The range is sufficient for flights from the West Coast of the United States to Tokyo, and is about 150% at the range of the British-French airliner of much larger size and similar speed. Referring to FIGS. 7 and 8, the following additional features are present:

a) longitudinally extended forward fuselage 10 having modified Sears-Haack profile and high length-to-diameter ratio, and carrying fuel, engines and landing gear (note associated shock wave 100 outboard of wing tips);

b) unswept, tapered wing with leading and trailing edge flaps, mounted on top of the flat-sided fuselage for minimum shock wave reflection on the wing, and with the engine inlet near the wing trailing edge to limit the extent of wing subject to inlet shock;

c) two-dimensional inlets designed for efficient supersonic pressure recovery;

d) aft fuselage faired into inlets and holding inlet ducts, engines and tail;

e) tail surfaces designed for maximum laminar flow according to the principals disclosed herein;

f) two-dimensional variable area exhaust nozzle.

FIG. 9 also illustrates two types of leading edge flaps. The hinged flap shown at (a) has been used previously on wings with sharp leading edges. The compound flap shown at (b) is a highly advantageous device configured to improve subsonic cruise performance as well as maximum lift for takeoff and landing. This leading edge device also illustrates a means of compensating for the rearward shift of aerodynamic center in going from subsonic to supersonic speed. As speed is increased, the sharp leading edge would be deployed forward, and the rounded leading edge would be retracted flush. The forward movement of the leading edge in the supersonic configuration helps compensate for the rearward movement of the aerodynamic center in passing from subsonic to supersonic flight.

Figure 1B:
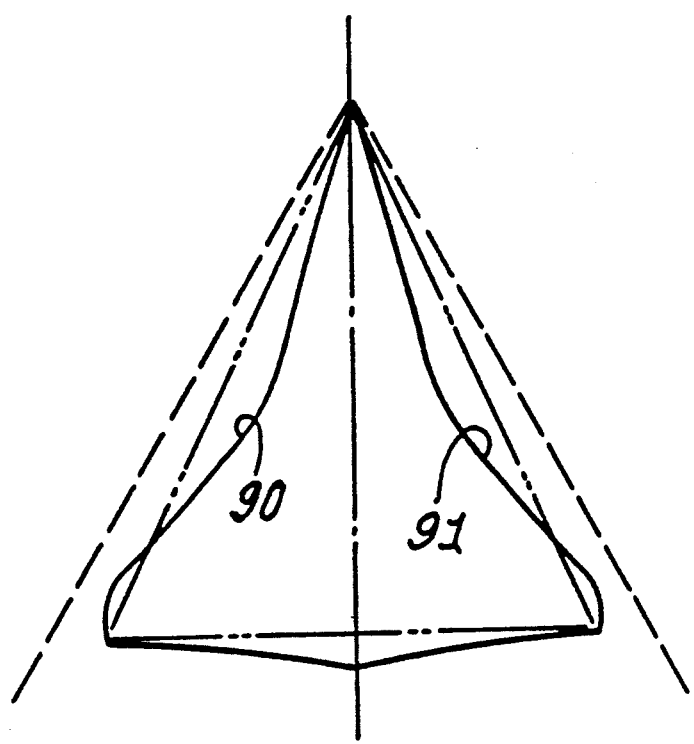

FIG. 1 compares the planforms of a representative modified delta wing (FIG. 1b) and a laminar-configured wing or wings 11' and 12' (FIG. 1a). The Mach angle (the angle from the flight direction whose trigonometric sine is the reciprocal of the Mach number, e.g., 30° at Mach 2), and the fact that most of the leading edge of the delta-type wing has greater sweep back than the Mach angle. In this case, the component of flow normal to the leading edges 13' and 14' is less than Mach 1, that is, it is subsonic. Hence, the expression "subsonic leading edge" is used to describe this situation. Conversely, the laminar-configured wing is swept back at less than the Mach angle and has a "supersonic leading edge", since the component of the flight speed normal to the leading edge is supersonic. The importance of a supersonic leading edge is that it permits much lower spanwise presssure gradients and thus minimizes boundary layer crossflows, which would otherwise strongly destabilize the supersonic laminar boundary layer. By way of contrast, the boundary layer of the delta wing with subsonic leading edges is almost entirely turbulent as the result of the crossflow induced instability. See edges 90 and 91 in FIG. 1b.

FIG. 2 shows the minimum drag as a fraction of lift versus Mach number for two wings. Two drag calculations are shown: the ideal drag of a delta wing shown at (a), and a fairly thick (4%) straight wing shown at (b), typical of earlier designs. The delta calculation neglects drag due to thickness and assumes full leading edge suction thrusts. The straight wing calculation is based on two-dimensional linearized flow theory. In both cases, the boundary layer is assumed to be fully turbulent, and skin friction is calculated for a chord Reynolds number of 40 million. This figure illustrates the sort of calculation that a designer would make based on prior art, and shows why the straight wing is not being seriously considered for efficient supersonic cruise designs, in view of the apparent penalty in drag.

FIG. 3 shows the minimum drag as a fraction of lift, for a series of laminar-configured wings, versus Mach number. Three thickness ratios are shown to illustrate the effect of thickness, for a fully laminar boundary layer. Also shown for comparison is the drag of a realistic delta wing, based on semi-empirical theory and turbulent skin friction. In all cases, the Reynolds number is taken as $40 \times 10^6$, typical of flight at Mach 2 at 55,000 feet altitude with a wing chord of 22 feet. The effect of thickness in increasing the minimum drag is apparent, as is the fact that for thickness ratios less than about 4%, the minimum drag of the laminar-configured wing is less than the minimum drag for a realistic delta wing; and with a thickness of 2% or less, the laminar wing drag is substantially less than the drag of the turbulent delta.

For the laminar-configured case, wave drag due to thickness and lift were calculated according to two-dimensional, linear, supersonic theory as first presented by A. Ackeret in 1925. The errors in minimum drag introduced by linear theory for this type of wing configuration can be estimated by comparison with exact oblique shock theory, and are found to be typically from 2% to 5% for angles of interest at most moderate supersonic Mach numbers. Tip effects on minimum drag can be calculated and are found to be of the same magnitude; the tip effect on minimum drag can be reduced or even illuminated by suitable planform design, as shown in FIG. 1 above. Shaded areas 96 in FIG. 1a show wing areas to be added. See broken line locations of Mach lines.

Figure 4:
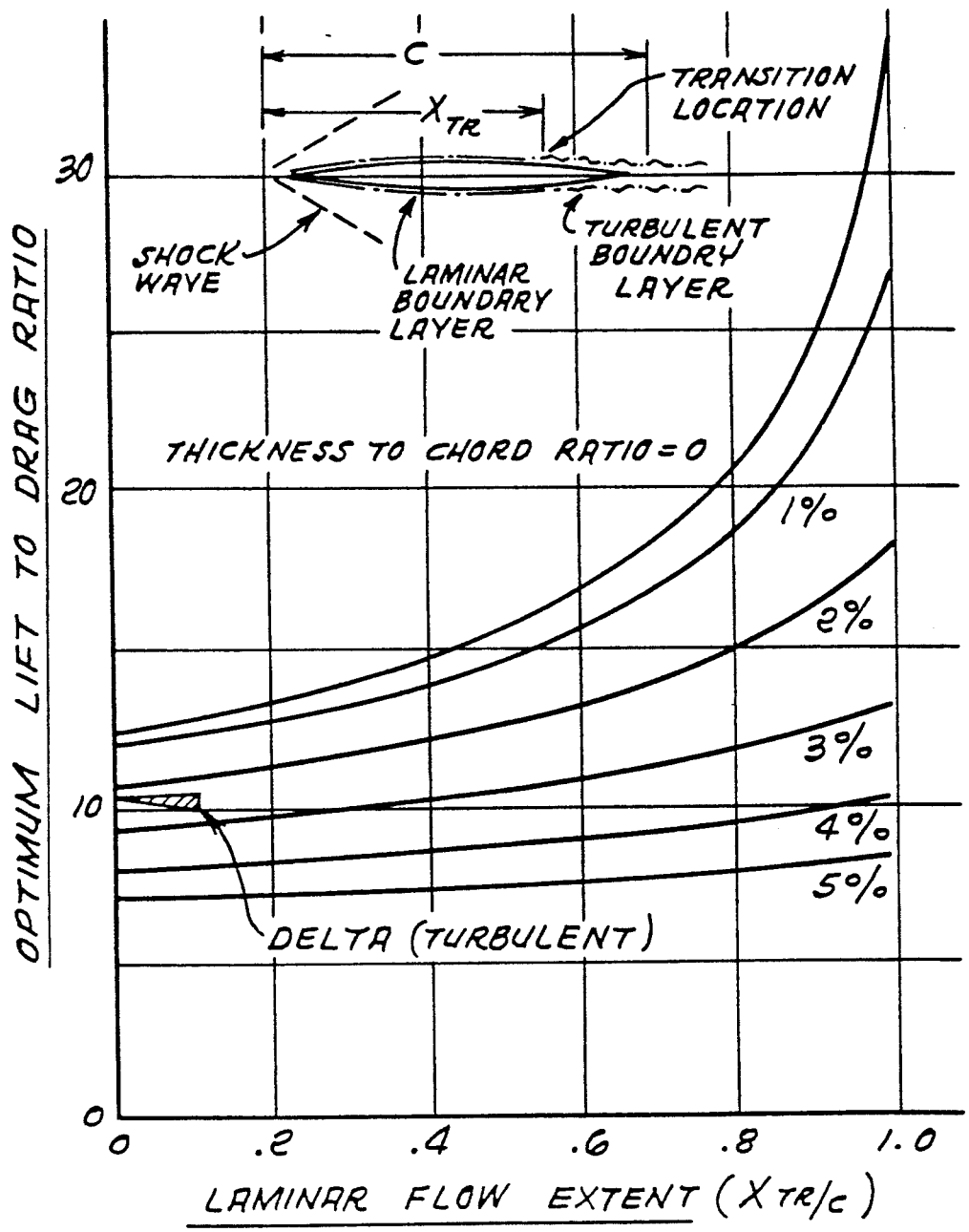
FIG. 4 is a graph showing the effects of both thickness and extent of laminar boundary layer as a function of the wing chord on the optimum lift-to-drag ratio of the laminar configured wing, at Mach 2.

FIG. 4 shows the effect of both thickness and extent of laminar boundary layer as a fraction of the wing chord, on the optimum lift-to-drag ratio of the laminar-configured wing at Mach 2. Similar charts correspond to other Mach numbers. Also shown in FIG. 4 is the value for the lift-to-drag ratio of a realistic turbulent delta wing at the same Mach number, and chord Reynolds number ($40 \times 10^6$). There is seen to be a wide range of thicknesses and laminar fractions for which the laminar-configured wing has a significantly better lift-to-drag ratio than the turbulent delta.

Figure 5A:
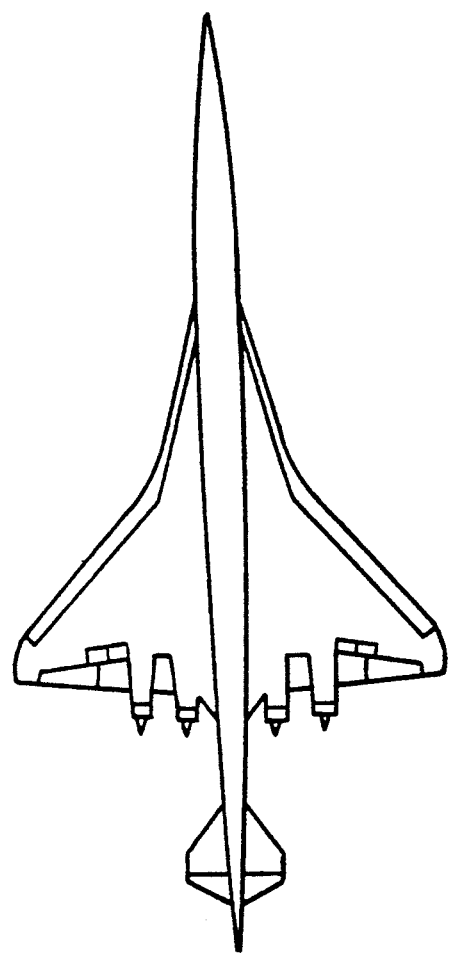
FIGS. 5a and 5b are a plan view of Boeing SST, seen in (a), and a plan view of a laminar SST, of the present invention, seen in (b)
Figure 5B:
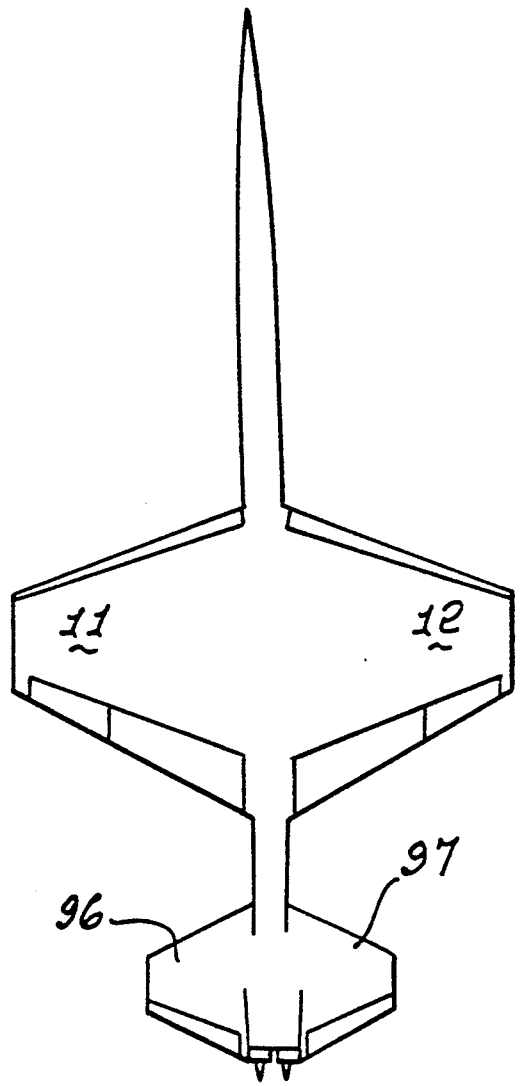

FIG. 5 compares a recent modified delta-wing supersonic transport design (a) developed by Boeing under a NASA contract, for flight at Mach 2.4, with a laminar-configured design (b) in accordance with the present invention. The transport of the present invention, like the Boeing SST, is designed to hold 247 passengers, and the same amount of fuel. The laminar-configured design is assumed to have the same gross weight as the Boeing design—745,000 lb. The laminar design has a wing and tail thickness of 1.75% at the root and 1.25% at the tip, and wing and tail boundary layer that is assumed to be 80% laminar and 20% turbulent. The wing and tail of the laminar design are larger than those of the delta. Similarly, the fuselage is larger to carry the majority of fuel which cannot be carried in the thin wings. Wings 11 and 12 in FIG. 5 (b) correspond to those in FIGS. 7 and 8.

Figure 6:
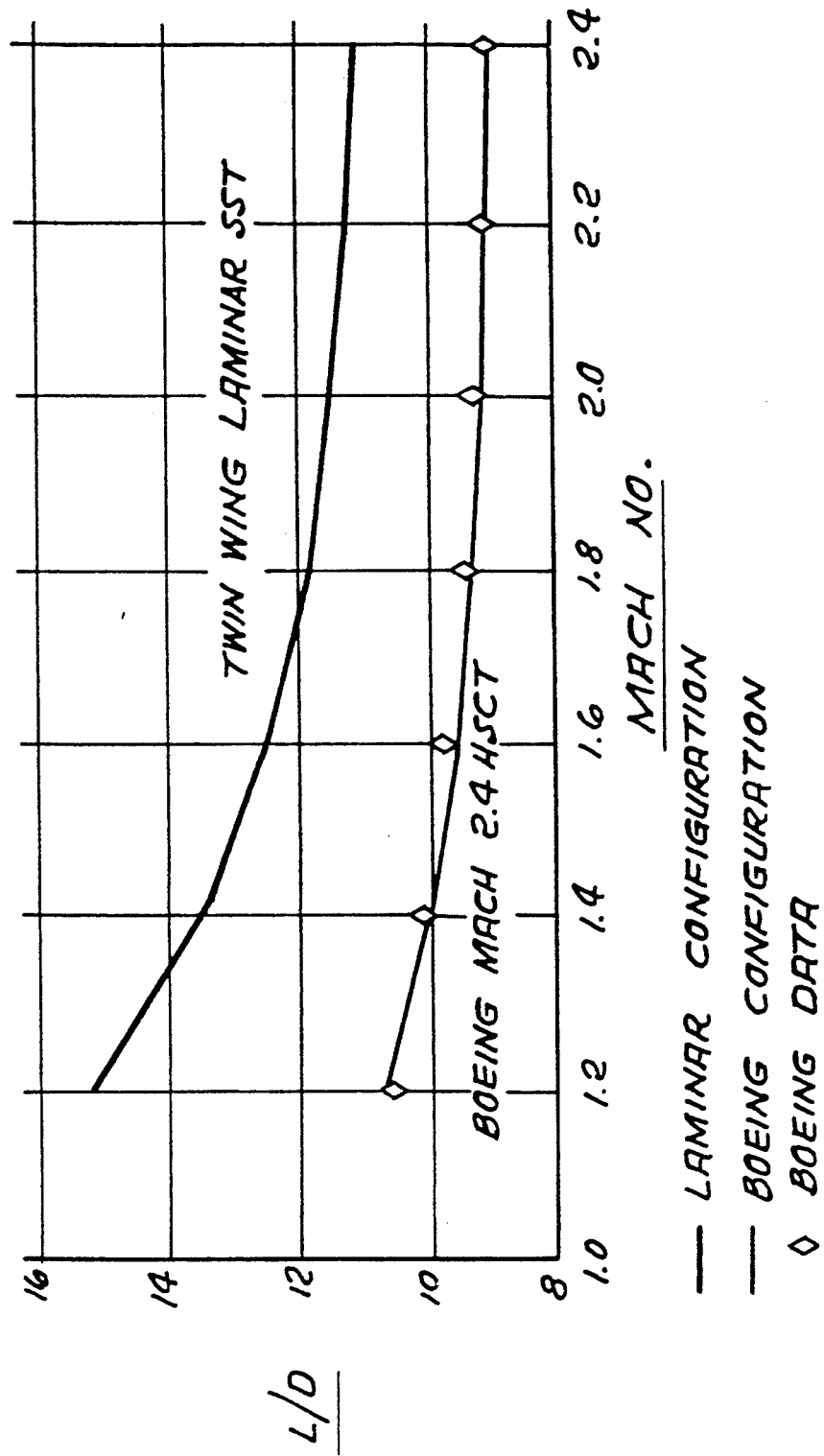
FIG. 6 is a graph of lift-to-drag ratio, as a function of Mach number for both Boeing (Delta) SST and the laminar flow SST.

Despite these differences, the graph of FIG. 6 shows that the best lift-to-drag ratio of the laminar design is about 25% higher than the Boeing design at Mach 2 and about 28% higher at Mach 1.6, its most economical cruise Mach number. The illustrated level of aerodynamic improvement is approximately enough to make the SST range and cost comparable to present subsonic long-range transports, such as the Boeing 747-400.

Additional benefits of the present invention derive from the reduced sweep and lower design lift coefficient associated with optimum design of the laminar-configured wing, and from the greater freedom to choose aspect ratio without limitations of cruise Mach number as compared to an optimum delta-type wing. The greater aspect ratio and reduced sweep of the laminar design results in lower angles of attack and lower drag during takeoff and landing. Also, because of its lower sweep and more efficient trailing edge flaps, the laminar wing has higher maximum lift resulting in lower takeoff and landing speeds, especially if fitted with leading edge flaps or similar devices.

The lower cruise design lift coefficient of the laminar configuration permits a combination of lower cruise altitude and lower wing loading. The former is important in holding the efficient cruise altitudes below the critical band of risk of ozone damage by engine exhaust emissions. The second means still lower speeds for take-off and landing, with correspondingly less noise and runway length.

Referring to FIGS. 5 (b) and 7, the lateral tail sections 96 and 97 have substantially the same configurations as the wings 11 and 12.

The leading edges 13 and 14, as represented by 13' in FIG. 9 (a) and (b), have sharpness, as defined by angularity δ less than about 5°, between upper and lower surfaces 98 and 99 that taper forwardly. See also the insert in FIG. 4 where chordal dimension C is shown.

From the foregoing, it will be understood that the invention is characterized by a wing for use on an airplane designed for efficient supersonic flight, the wing having a longitudinal axis in the direction of flight, leading and trailing edges, wing tip ends and upper and lower surfaces. The wing is further characterized as follows, excluding the portions near the wing tip end:

a) the wing having leading edge sweep angularity Ω, the absolute value of which is less than about 30 degrees at all spanwise locations, wherein leading edge sweep angularity at any spanwise location is defined as the angle between the tangent to the leading edge of that wing at that location, and the plane normal to the longitudinal axis of the airplane, b) the wing having leading edge sharpness defined by upper and lower wing surfaces which taper toward said leading edge to define an angle closely proximate the leading edge at all spanwise locations, and which is less than about 5 degrees, c) the wing having an airfoil cross sectional shape at each spanwise location, defined by the intersections of the upper and lower wing surfaces with a vertical plane parallel to the longitudinal axis at the spanwise location, the airfoil cross sectional shape being free from concavity for the majority of its longitudinal length measured from said leading edge, d) the wing having a thickness-to-chord ratio which is less than about 0.02, as an average along the span of the wing, wherein the thickness-to-chord ratio at any spanwise location is defined as the maximum vertical height of the airfoil cross sectional shape of said spanwise location, divided by said its longitudinal length at said spanwise location.

A further aspect of the invention is an airplane which has a supersonic cruise flight envelope and a critical supersonic cruise flight condition, and wherein the wing has spanwise taper, which together with said sweep angularity and said airfoil cross sectional shape satisfies pressure gradient criteria necessary to maintain laminary boundary layer flow conditions over the majority of the wing surfaces at the critical supersonic cruise flight condition, and wherein spanwise taper is defined as the angularity between said leading and trailing edges, and the critical supersonic cruise flight condition being defined as the combination of speed, altitude and angle of attack within the supersonic cruise flight envelope of said airplane, which is least conducive to maintaining laminar flow on said wing.

Another aspect of the invention is the provision of wing surfaces that have roughness, gaps and deviations from contour which satisfy disturbance criteria necessary to maintain laminar boundary layer flow conditions over the majority of said surfaces, at the critical supersonic cruise flight condition. The airplane body extends longitudinally forwardly and rearwardly relative to the wing, and the stated characterization of the wing excludes the portions of the wing near the wing-body juncture ends. Typically, airplane engine means is or are carried on said body, and fuel tank means are also carried by the body.

Yet another aspect of the invention is a wing located in such relation to the body that the wing leading edge is free of impingement of shock waves extending from the body and from the engine means inlet, satisfied by the expression:

$$l \geq b\sqrt{M_M^2 - 1}$$

wherein:
 $M_M$ = the highest Mach number of the supersonic cruise flight envelope
 b = the distance of said wing tip from the longitudinal axis
 l = the minimum distance forward of the wing leading edge to a point on the body which can produce a shock wave, such as the engine means inlet or the nose of the body.

Another aspect of the leading edge sweep angularity Ω is that it satisfies the expression:

$$\Omega \leq \text{arc cosine } (1/M_L)$$

wherein $M_L$ is defined as the lowest Mach number of the supersonic cruise flight envelope of the airplane.

A further feature is the provision of a tail having upper and lower surfaces, tail tip ends, tail-body juncture ends, and the tail being characterized as follows, excluding the portions near the tail tip ends and near the tail-body juncture ends of said tail:

a) the tail having leading edge angularity Ω, whose absolute value satisfies the expression:

$$\Omega \leq \text{arc cosine } (1/M_L)$$

at all spanwise locations, b) the tail having leading edge sharpness which is less than about 5° at all spanwise locations, c) the tail having an airfoil cross sectional shape at each spanwise location, which is free from concavity for the majority of its length measured from the leading edge, d) the tail having a thickness-to-chord ratio which is less than about 0.02 as an average along the span of the tail.

Additional features of include flap means associated with the wing leading edge and supported for downward deployment during subsonic flight; as during aircraft landing; aileron means associated with the wing trailing edge, supported for angular movement to control roll motion of the airplane; elevator means associated with the tail trailing edge, supported for angular movement, to control pitch motion of the airplane; and rudder means associated with the tail trailing edge, supported for angular movement, to control yaw motion of the airplane.

I claim:

1. A wing for use on an airplane designed for efficient supersonic flight, said wing having leading and trailing edges, a longitudinal axis extending directionally between said edges wing tip ends and upper and lower surfaces, said wing having a main portion and a tip portion:

a) said main portion of the wing having leading edge sweep angularity $\Omega$, the absolute value of which is less than 30 degrees at all spanwise locations, wherein said leading edge sweep angularity at any spanwise location is defined as the angle between the tangent to the leading edge of said wing at said location, and the plane normal to the longitudinal axis of said airplane, b) the wing having leading edge sharpness defined by upper and lower wing surfaces which taper toward said leading edge to define an angle closely proximate said leading edge at all spanwise locations, and which is less than about 5 degrees, c) the wing having an airfoil cross sectional shape at each spanwise location, defined by the intersections of said upper and lower surfaces with a vertical plane parallel to said longitudinal axis at said spanwise location, said airfoil cross sectional shape being free from concavity for the majority of its longitudinal length measured from said leading edge, d) the wing having a thickness-to-chord ratio which is less than about 0.02, as an average along the span of said wing, wherein said thickness-to-chord ratio at any spanwise location is defined as the maximum vertical height of said airfoil cross sectional shape of said spanwise location, divided by said its longitudinal length at said spanwise location.

2. The combination of claim 1 wherein the airplane has a supersonic cruise flight envelope and a critical supersonic cruise flight condition, and wherein the wing has spanwise taper, which together with said sweep angularity and said airfoil cross sectional shape satisfies pressure gradient criteria necessary to maintain laminary boundary layer flow conditions over the majority of the wing surfaces at the critical supersonic cruise flight condition, and wherein spanwise taper is defined as the angularity between said leading and trailing edges, and the critical supersonic cruise flight condition being defined as the combination of speed, altitude and angle of attack within said supersonic cruise flight envelope of said airplane, which is least conducive to maintaining laminar flow on said wing.

3. The combination of claim 2 wherein the wing surfaces have roughness, gaps and deviations from contour which satisfy disturbance criteria necessary to maintain laminar boundary layer flow conditions over the majority of said surfaces, at the critical supersonic cruise flight condition.

4. The combination of claim 3 wherein said airplane has a fuselage which extends longitudinally forwardly and rearwardly relative to said wing main portion.

5. The combination of claim 4 including airplane engine means carried on said body.

6. The combination of claim 5 wherein the wing is located in such relation to said fuselage that the wing leading edge is free of impingement of shock waves extending from the body and from the engine means inlet, satisfied by the expression:

$$l \geq b\sqrt{M_M^2 - 1}$$

wherein:

$M_M$ = the highest Mach number of the supersonic cruise flight envelope b = the distance of said wing tip from the longitudinal axis l = the minimum distance forward of the wing leading edge to a point on the body which can produce a shock wave, such as the engine means inlet or the nose of the body.

7. The combination of claim 4 including airplane fuel tank means carried by said fuselage.

8. The combination of claim 2 wherein the absolute value of the leading edge sweep angularity satisfies the expression: $\Omega \leq$ arc cosine $(1/M_L)$ wherein $M_L$ is defined as the lowest Mach number of said supersonic cruise flight envelope of said airplane.

9. The airplane of claim 5 having a tail, said tail having upper and lower surfaces, tail tip ends, tail-body juncture ends, said tail having a main portion, a tip portion, and a portion proximate the tail-fuselage juncture end:

a) the tail main potion having leading edge sweep angularity $\Omega$, whose absolute value satisfies the expression:

$$\Omega \leq \text{arc cosine } (1/M_L)$$

at all spanwise locations, wherein $M_L$ is defined as the lowest Mach number of said supersonic cruise flight envelope of said airplane, b) the tail having leading edge sharpness which is less than about 5° at all spanwise locations, c) the tail having an airfoil cross sectional shape at each spanwise location, which is free from concavity for the majority of its length measured from the leading edge, d) the tail having a thickness-to-chord ratio which is less than about 0.02 as an average along the span of said tail.

10. The combination of claim 5 including flap means associated with the wing leading edge and which are supported for downward deployment during subsonic flight.

11. The combination of claim 5 including flap means associated with the wing trailing edge which are supported for downward deployment during subsonic flight, as during landing of the airplane.

12. The combination of claim 3 including aileron means associated with the wing trailing edge, supported for angular movement to control roll motion of the airplane.

13. The combination of claim 9 wherein the tail has a trailing edge, and including elevator means associated with the tail trailing edge, and wherein said elevator means are supported for angular movement, to control pitch motion of the airplane.

14. The combination of claim 9 wherein the tail has a trailing edge, and including rudder means associated with the tail trailing edge, and wherein said rudder means are supported for angular movement, to control yaw motion of the airplane.

15. In combination with an airplane designed for efficient supersonic flight, a wing having leading and trailing edges, wing tip ends and upper and lower surfaces, said airplane having a longitudinally extending axis, and a body which extends forwardly and rearwardly relative to the wing, said wing having a main portion, a tip portion, and a wing fuselage juncture end portion:

a) said main portion of the wing having leading edge sweep angularity, the absolute value of which is less than 30 degrees at all spanwise locations, wherein said leading edge sweep angularity at any spanwise location is defined as the angle between the tangent to the leading edge of said wing at said location, and the plane normal to the longitudinal axis of said airplane, b) the wing having leading edge sharpness defined by upper and lower wing surfaces which taper toward said leading edge to define an angle closely proximate said leading edge at all spanwise locations which is less than about 5 degrees, c) the wing having an airfoil cross sectional shape at each spanwise location, defined by the intersections of said upper and lower surfaces and a vertical plane parallel to said longitudinal axis at said spanwise location, said airfoil cross sectional shape being free from concavity for a distance of at least about 60% of its longitudinal length measured from said leading edge, d) the wing having a maximum thickness-to-chord ratio which is less than about 0.02, as an average along the span of said wing, wherein said maximum thickness-to-chord ratio at any spanwise location is defined as the maximum vertical height of said airfoil cross sectional shape at said spanwise location, divided by its longitudinal length at said spanwise location, e) the wing having an associated maximum thickness-to-chord ratio proximate the wing-body juncture ends and said ratio being less than about 0.025.

16. The combination of claim 15 wherein the airplane has a supersonic cruise flight envelope and a critical supersonic cruise flight condition, and wherein the wing has spanwise taper, which together with said sweep angularity and said airfoil cross sectional shape satisfies pressure gradient criteria necessary to maintain laminary boundary layer flow conditions over the majority of the wing surfaces at the critical supersonic cruise flight condition, and wherein spanwise taper is defined as the angularity between said leading and trailing edges, and the critical supersonic cruise flight condition being defined as the combination of speed, altitude and angle of attack within the supersonic cruise flight envelope of said airplane, which is least conducive to maintaining laminar flow on said wing.

17. The combination of claim 16 wherein the wing surfaces have roughness, gaps and deviations from contour which satisfy disturbance criteria necessary to maintain laminar boundary layer flow conditions over the majority of said surfaces, at said critical supersonic cruise flight condition.

18. The combination of claim 15 including engine means carried on said body.

19. The combination of claim 18 wherein the wing is located in such relation to the body that the wing leading edge is free of impingement of shock waves extending from the body and from the engine means inlet, satisfied by the expression:

$$l \geq b \cdot \sqrt{M_M^2 - 1}$$

wherein:
$M_M$ = the highest Mach number of the supersonic cruise flight envelope
b = the distance of said wing tip from the longitudinal axis
l = the minimum distance forward of the wing leading edge to a point on the body which can produce a shock wave, such as the engine means inlet or the nose of the body.

20. The combination of claim 18 wherein the airplane has a tail, said tail having upper and lower surfaces, tail tip ends, tail-body juncture ends, said tail being characterized as follow, excluding the portions near the tail tip ends and near the tail-body juncture ends of said tail:

a) the tail having leading edge angularity $\Omega$, whose absolute value satisfies the expression:

$$\Omega \leq \text{arc cosine } (1/M_L)$$

at all spanwise locations, wherein $M_L$ is defined as the lowest Mach number of said supersonic cruise flight envelope of said airplane, b) the tail having leading edge sharpness which is less than about 5° at all spanwise locations, c) the tail having an airfoil cross sectional shape at each spanwise location, which is free from concavity for the majority of its length measured from the leading edge, d) the tail having a thickness-to-chord ratio which is less than about 0.02 as an average along the span of said tail.

* * * * *

UNITED STATES PATENT AND TRADEMARK OFFICE
CERTIFICATE OF CORRECTION

PATENT NO. : 5,322,242
DATED : June 21, 1994
INVENTOR(S) : Richard R. Tracy

It is certified that error appears in the above-identified patent and that said Letters Patent is hereby corrected as shown below:

On the title page, [57] ABSTRACT, line 6 "an angle $\Lambda$, and the wing having a maximum thickness" should read --an angle $\Lambda$, and the wing having a maximum thickness-- and on line 7 "t; the angle $\Lambda$ and thickness t characterized that in that" should read --t; the angle $\Lambda$ and thickness t characterized that in that--

Column 3, line 55, "an angle $\Lambda$ and the wing having a maximum thickness", should read --an angle $\Lambda$, and the wing having a maximum thickness--

Column 3, line 57, "b) the angle $\Lambda$ and thickness t characterized that in", should read --b) the angle $\Lambda$ and thickness t characterized that in--

Column 3, line 64, "As will be seen, the angle $\Lambda$ is typically between 0°", should read --As will be seen, the angle $\Lambda$ is typically between 0°--

Column 4, line 4, "of the angle $\Lambda$, as referred to, is typically defined as", should read --of the angle $\Lambda$, as referred to, is typically defined as--

Column 4, line 7, "$\Lambda \leq$ arc cosine (1/M)" should read --$\Lambda \leq$ arc cosine (1/M)--

UNITED STATES PATENT AND TRADEMARK OFFICE
CERTIFICATE OF CORRECTION

PATENT NO. : 5,322,242
DATED : June 21, 1994
INVENTOR(S) : Richard R. Tracy

It is certified that error appears in the above-identified patent and that said Letters Patent is hereby corrected as shown below:

Column 5, line 41, "being less than about 0.015. Angle $\Lambda$ is further defined", should read --being less than about 0.015. Angle $\Lambda$ is further defined--

Column 5, line 43, "$\Lambda \leq$ arc cosine (1/M)", should read --$\Lambda \leq$ arc cosine (1/M)--

Column 5, line 50, "indicated at $\Lambda$. The angle $\Lambda$ and the thickness t are", should read --indicated at $\Lambda$. The angle $\Lambda$ and the thickness t are--

Column 5, line 57, "cally, the angle $\Lambda$ is between 0° and 30°", should read --cally, the angle $\Lambda$ is between 0° and 30°.--

Column 10, line 27, "$\Lambda$ is that it satisfies the expression:", should read --$\Lambda$ is that it satisfies the expression:--

Column 10, line 29, "$\Lambda \geq$ arc cosine $(1/M_L)$", should read --$\Lambda \geq$ arc cosine $(1/M_L)$--

Column 10, line 38, "a) the tail having leading edge angularity $\Lambda$, whose", should read --a) the tail having leading edge angularity $\Lambda$, whose--

UNITED STATES PATENT AND TRADEMARK OFFICE
CERTIFICATE OF CORRECTION

PATENT NO. : 5,322,242
DATED : June 21, 1994
INVENTOR(S) : Richard R. Tracy

It is certified that error appears in the above-indentified patent and that said Letters Patent is hereby corrected as shown below:

Column 10, line 41, "$\Lambda \geq$ arc cosine $(1/M_L)$, should read --$\Lambda \leq$ arc cosine $(1/M_L)$--

Column 11, line 4, "sweep angularity $\Lambda$, the absolute value of which is", should read --sweep angularity $\Lambda$, the absolute value of which is--

Column 12, line 13, "expression $\Lambda \leq$ arc cosine $(1/M_L)$ wherein $M_L$ is de-", should read --expression $\Lambda \leq$ arc cosine $(1/M_L)$ wherein $M_L$ is de- --

Column 12, line 22, "angularity $\Lambda$, whose absolute value satisfies the", should read --angularity $\Lambda$, whose absolute value satisfies the--

Column 12, line 25, "$\Lambda \leq$ arc cosine $(1/M_L)$, should read --$\Lambda \leq$ arc cosine $(1/M_L)$--

Column 14, line 32, "a) the tail having leading edge angularity $\Lambda$, whose", should read --a) the tail having leading edge angularity $\Lambda$, whose--

UNITED STATES PATENT AND TRADEMARK OFFICE
CERTIFICATE OF CORRECTION

PATENT NO. : 5,322,242
DATED : June 21, 1994
INVENTOR(S) : Richard R. Tracy

It is certified that error appears in the above-indentified patent and that said Letters Patent is hereby corrected as shown below:

Column 14, line 35, "$\Lambda \leqq$ arc cosine $(1/M_L)$, should read -- $\Lambda \leqq$ arc cosine $(1/M_L)$ --

Signed and Sealed this

Seventeenth Day of January, 1995

Attest:

BRUCE LEHMAN

Attesting Officer

Commissioner of Patents and Trademarks